Figure 1:
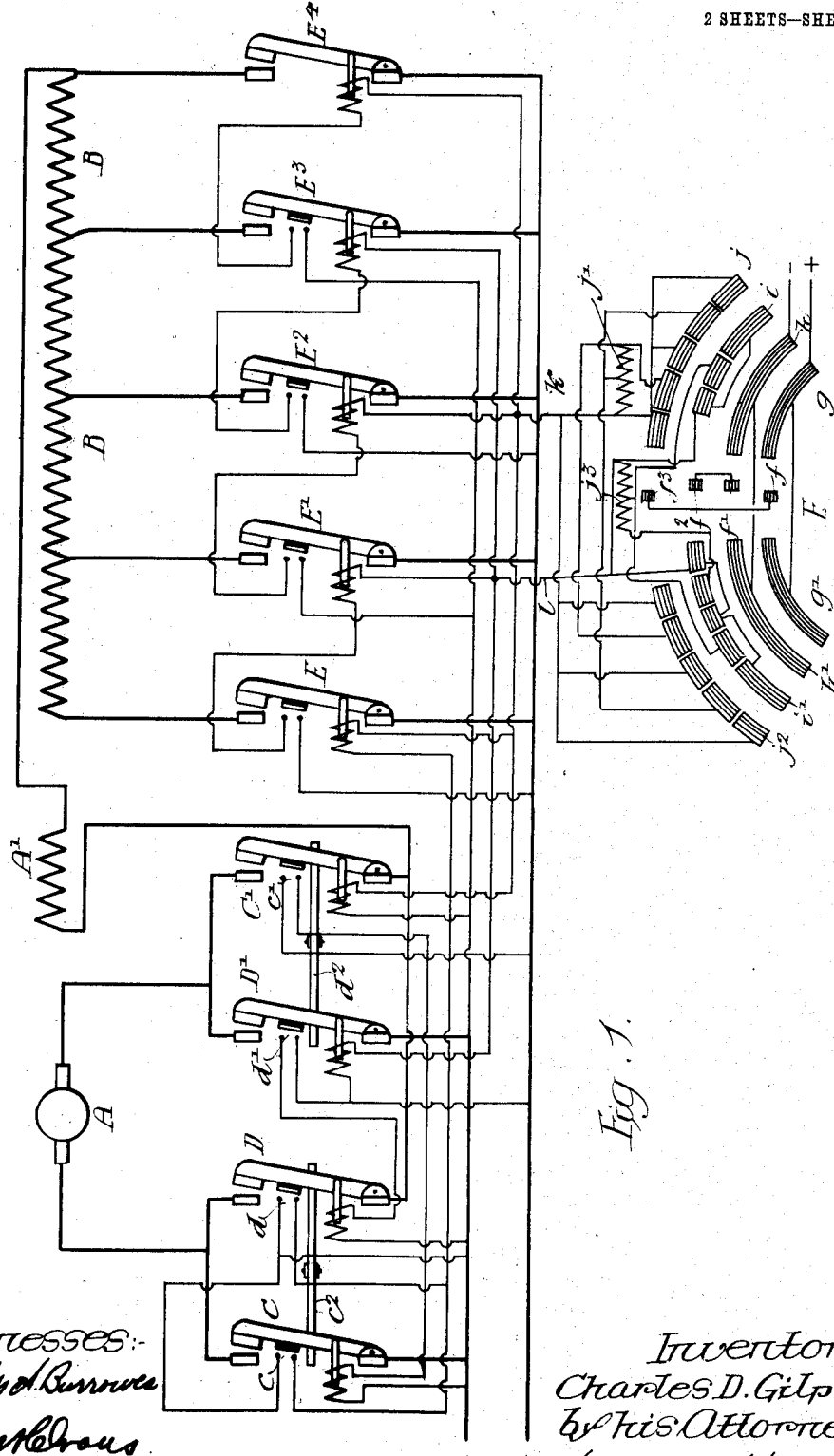

No. 813,879. PATENTED FEB. 27, 1906.
C. D. GILPIN.
SYSTEM OF CONTROL FOR ELECTRIC MOTORS.
APPLICATION FILED OCT. 6, 1905.

2 SHEETS—SHEET 1.

Witnesses:-
Willy A. Burrows
Titus K. Evans

Inventor:
Charles D. Gilpin.
by his Attorneys.
Howson + Howson

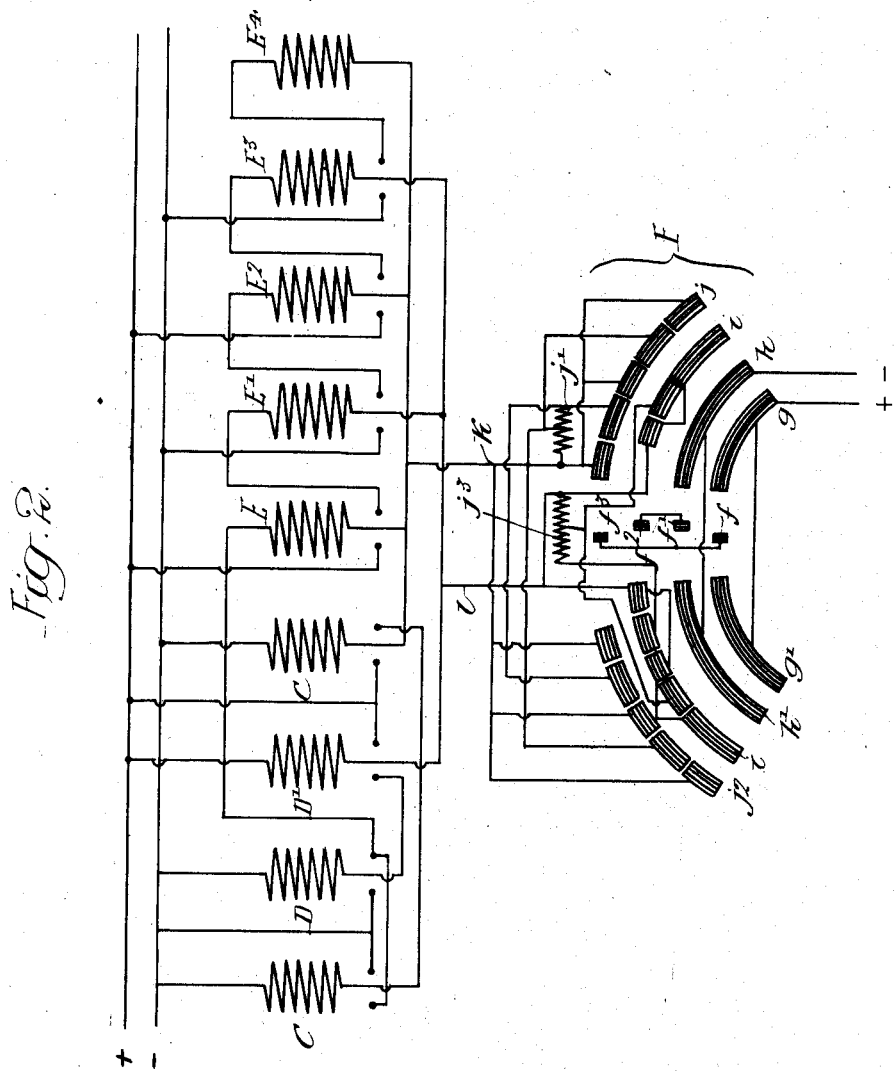

UNITED STATES PATENT OFFICE.

CHARLES D. GILPIN, OF CLEVELAND, OHIO, ASSIGNOR TO THE ELECTRIC CONTROLLER & SUPPLY COMPANY, OF CLEVELAND, OHIO, A CORPORATION OF OHIO.

SYSTEM OF CONTROL FOR ELECTRIC MOTORS.

No. 813,879.　　　Specification of Letters Patent.　　　Patented Feb. 27, 1906.

Application filed October 6, 1905. Serial No. 281,651.

*To all whom it may concern:*

Be it known that I, CHARLES D. GILPIN, a citizen of the United States, residing in the city of Cleveland, State of Ohio, have invented an Improved System of Control for Electric Motors, of which the following is a specification.

One object of my invention is to provide a system including a novel arrangement of apparatus and electrical connections whereby the operation of an electric motor or motors may be controlled from a distance by means of a master-controller having but two wires connecting it with the remainder of the system. It is further desired to provide such an arrangement of apparatus and connections that a master-controller having connection with supply-mains and connected to a series of motor-controlling switches through but two wires may be caused to control not only the speed, but also the direction of rotation of the armature or armatures of one or more motors. These objects I attain as hereinafter set forth, reference being had to the accompanying drawings, in which—

Figure 1 is a diagrammatic view of the apparatus and connections comprising my motor-controlling system, and Fig. 2 is a somewhat simplified diagram of the connections and apparatus illustrated in Fig. 1.

In carrying out my invention I provide for the control of a given motor a body of current-limiting resistance, a series of resistance-controlling switches, a set of switches connected to form reversing means for the motor, a master-controller, and connections between the master-controller, the supply-mains, and the switches, said connections being so arranged that there are but two wires between the controller and the switches. Certain of the switches are provided with auxiliary switches, whereby they are made to control the operation of others of their number, and certain of them have interlocking means whereby they are prevented from closing when other switches are closed.

In the above drawings, A is the armature of the motor to be operated and controlled, its field-winding being shown at A' and the controlling resistance being illustrated at B. Electromagnetic switches C, C', D, and D' are connected to serve as reversing means for the motor, their connections being such that when switches C and C' are closed current flows through the motor-armature and field-winding in a definite direction, thereby causing rotation of said armature in a certain direction. When, on the other hand, the switches D and D' are closed, the direction of current-flow in the armature is reversed, though it remains the same through the field-winding, and as a consequence the direction of rotation of the armature is reversed. In order to prevent the possibility of more than one pair of these four switches being in a closed position at the same time, I provide locking-bars, of which one, $c^2$, extends between the blades of switches C and D, while the other, $d^2$, extends between the blades of switches D' and C' in the manner well known to those skilled in the art, the bar $c^2$, for example, making it impossible for the switch C to close while switch D is closed, and vice versa.

One end of a body of resistance B is connected to the free end of the motor field-winding A', and there are at intervals along its length taps connected to what in the case illustrated are the upper terminals of the resistance-controlling switches E $E^4$. The lower terminals of these switches are connected directly to one of the current-supply mains, (in the case shown the positive,) while the lower terminals of the switches C and D' are directly connected to the negative supply-main.

Each of the switches of the reversing device, as well as all but one of those comprising the resistance-controlling means, are provided with auxiliary switches constructed to be closed by the closing of the particular switch to which they are attached and connected to the master-controller F and to the actuating-coils of other switches, as will hereinafter be described.

The master-controller F consists of a number of segmental contact-pieces preferably mounted in two groups along the arcs of four concentric circles, there being an operating-lever for this controller having mounted upon it four contacts, of which those respectively nearest to and farthest from the center—namely, $f$ and $f^3$—are likewise electrically connected to each other, but insulated from the other two contacts. Of the segmental contacts the two indicated by the reference-letters $q$ and $q'$ and arranged upon the arc having the least radius are electrically connected to each other and to one of the current-supply mains—in the present instance the positive—while the contacts $h$ and $h'$ of the next larger arc of the controller are similarly connected to each other and to the other current-supply main—namely, the negative. Of the contacts $j$ and $j^2$, arranged along the arc of the greatest radius, the first, third, and fifth of each of the two groups are electrically connected to each other and to a single wire $k$, extending from the master-controller to the motor-controlling switches of the system. The bank of resistance $j'$ has one end connected to the first of the segments $j$ and its other end connected to the second segment of the same group, as well as to the second segment of the group $j^2$, while the fourth segments of both of the groups $j$ and $j^2$ are electrically connected to each other and to a point of the resistance $j'$ intermediate of its ends. The segments of the third arc of the controller are, like the others, divided into two groups $i$ and $i'$, there being in the first of these groups but three segments, of which the first and third are electrically connected to each other and to one end of a bank of resistance $j^3$, as well as to a wire $l$, constituting the second conductor, extending between the master-controller and the motor-controlling switches of the system. Also connected to this wire are the first, third, and fifth segments of the group $i'$, while the fourth of this latter group is connected to the second of the contacts $i$ and to a point of the bank of resistance $j^3$ intermediate of its ends, it being noted that the second end of this bank of resistance is connected to the second segment of the group $i'$. The wire $k$ connecting the master-controller with the remainder of the system is electrically connected to one end of the actuating-coils of switches $C'$, $E$, $E^2$, and $E^4$, while the second connecting-wire $l$ is connected to one end of the actuating-coils of switches $D'$, $E'$, and $E^3$. It may here be noted that the bank of resistance $j^3$ is so proportioned that when by the operation of the master-controller it is placed in series with the actuating-coil of one of the switches of the system it permits sufficient current to flow to hold such switch closed if it is already closed, although this current is not of sufficient magnitude to cause closing of the switch if it be open. That portion of this same bank of resistance included between its intermediate connection and that end connected to the wire $l$ is also so proportioned that if it be connected in series with two switch-actuating coils in multiple with each other it will hold these two stitches closed if they be already closed, though, as before, this current will be insufficient to cause the switches to close if they are open. This same statement is true as regards the bank of resistance $j'$, that portion included between the end connected to the wire $k$ and its intermediate connection being similarly so proportioned that if it be placed in series with the coils of three switches respectively connected in multiple to each other the current-flow will be such that these switches will remain closed if they are already closed, though they will not be operated if they are in their open position. The actuating coil of switch C has one end directly connected to the negative supply-main, while its second end is connected through the auxiliary switch of switch $C'$ to the positive supply-main. The coil of switch $C'$ while having one end in connection with the wire $k$ has its second end directly connected to the negative supply-main. The auxiliary switch of the switch C has one terminal connected to the negative supply-main and to one terminal of the auxiliary switch of the main switch D, while its second terminal is connected to one end of the actuating-coil of the main switch E. The second terminal of the auxiliary switch $d$ is connected to the line extending between the auxiliary switch $c$ and one terminal of the actuating-coil of switch E, while the actuating-coil of switch D has one terminal connected to the negative supply-main and its second terminal connected through the auxiliary switch $d'$ to the positive supply-main. The coil of the switch $D'$, while having one end connected to the wire $l$, has its second end connected directly to the positive supply-main. As regards the resistance-controlling switches E to $E^4$, inclusive, it will be seen that the first, third, and last of these have one terminal of their respective coils connected to the wire $k$ from the master-controller, while the second terminal of the first of said coils is connected to the negative supply-main through the auxiliary switch $c$ of main switch C, which in operation is actuated just before said switch E. Similarly, the second terminal of the coil of switch $E^2$ is connected to the negative supply-main through the auxiliary switch of switch $E^4$, while the second end of the coil of switch $E^4$ is also connected through the auxiliary switch of main switch $E^3$ to said negative supply-main. The coils of the two switches $E'$ and $E^3$ each have one end, as noted above, connected to the wire $l$ and their other ends connected through the auxiliary switch of the main switch, which in operation is actuated immediately before them, to the negative supply-main. With this arrangement of apparatus and connections if the operating-lever of the master-controller F be moved, for example, to the right of its vertical position, so as to bring its contacts into engagement with the right-hand group $j$ of the controller-segments, it will be seen that the first of this group will be in direct electrical connection with the positive supply-main, and current will flow through the wire $k$, through the actuating-coil of switch C' to the negative supply-main, thereby causing this switch to close. While the coils of switches E, E², and E⁴ are also connected by this operation to the positive supply-main, none of them can close, because in each case their circuit includes an auxiliary switch of another main switch which is still open. The closing of main switch C' closes its auxiliary switch $c$, and so permits current to flow from the positive supply-main through the actuating-coil of switch C to the negative main, so that this latter switch closes, and consequently closes its auxiliary switch, which in turn permits current to flow from the positive supply-main to the master-controller through the wire $k$ to the coil of switch E, and hence to the negative supply-main. The closure of this last-named switch completes the circuit through the motor, and current will flow from the positive supply-main through switch E, and all of the resistance B, field-winding A', main switch C', armature A, and switch C to the negative supply-main. The motor will therefore start and continue to operate at its lowest speed until the lever of the master-controller be moved to its second point, by which operation the entire bank of resistance $j'$ is placed in series with the wire $k$, and consequently with the two actuating-coils of switches E and C', which are therefore maintained in their closed positions. The first of the segments $i$ is in addition placed in electrical connection with the segment $h$, connected to the negative supply-main through the two contacts $f'$ and $f^2$, so that current is permitted to flow from the positive supply-main through the coils of switches D' and E', and as a result the second of these will close, since the closure of switch E connected the coil of switch E' to the positive supply-main. The current will now flow from said positive main through auxiliary switch of main switch E to the coil of switch E' and wire $l$ to the first of contacts $i$ of the controller through the contacts on the operating-lever to the segment $h$, and so to the negative supply-main. Even though the coil of switch D' be energized this switch cannot close, because of the locking-bar $d^2$, which is held in such position by the closed switch C' as to prevent such action. The closure of the switch E' cuts out the first section of the controlling-resistance B, thereby permitting more current to flow to the motor and causing it to speed up. The movement of the operating-lever of the master-controller to its third point now places a portion of the resistance $j^3$ in series with the coils of switches D' and E', which are in multiple to each other, so that the latter of these switches is supplied with just sufficient current to hold it shut, while the third of the segments $j$, and hence the wire $k$, is again connected directly to the supply-main. Since the main switch E is held closed, its auxiliary switch is also closed, and current is free to flow from the positive supply-main through segment $g$, contacts $f$ and $f^3$, one of the segments $j$, wire $k$, coil of switch E², auxiliary switch of switch E', and hence to the negative supply-main, thus causing said switch E² to close. Movement of the operating-lever to the fourth point first places a portion of the resistance $j'$ in series with the three coils of switches E, C', and E² connected in multiple, thereby maintaining these in their closed positions, after which the third of the segments $i$ is directly connected to the negative supply-main, as is also the wire $l$, since the closing of switch E² connected one end of the coil of switch E³ directly to the positive supply-main. Since the second end of this coil is in direct connection with wire $l$, said coil is now supplied with current and switch E³ is closed, thus cutting out a further portion of the resistance B and further speeding up the motor. Since the closing of switch E³ connected the end of the coil of switch E⁴ directly to the negative supply-main, the movement of the operating-lever of the master-controller to its last point permits current to flow directly from the positive supply-main to contacts $f$ and $f^3$, the last of the contacts $j$, wire $k$, and through the coil and the auxiliary switch of main switch E³ to the negative supply-main, thereby causing closing of switch E⁴ and cutting out of the last part of the resistance B. Under these conditions the motor is connected directly across the supply-mains and will operate at full speed, for all the resistance-controlling switches, as well as two of the reversing-switches, are in their closed positions. If the operating-lever of the master-controller be moved to its "off" position, all of the switches will immediately open, and if it be moved to the left of this position into engagement with contacts $g'$, $h'$, $i'$, and $j^2$ the reversing-switches D and D' will be closed and after them in succession the switches E E⁴, thereby again gradually cutting out the resistance in circuit with the motor and bringing it up to full speed, as heretofore described.

It will be seen that by the above method of operation I first cause closing of a pair of the reversing-switches and afterward the successive operation of the resistance-controlling switches, one of the two wires from the master-controller being alternately connected directly to one of the supply-mains and in series with a bank of resistance, while the other is alternately connected to the other supply-main and to a second bank of resistance, in addition to which the closing of each main switch is controlled by an auxiliary switch closed by the operation of a main switch operating before it.

By this arrangement of apparatus those skilled in the art will appreciate the fact that the motor or motors may be operated from a master-controller situated at any desired distance from them and from the main switches, and yet require but two wires $k$ and $l$ to connect said master-controller with the rest of the system. At the same time it will be seen that I can by this arrangement govern not only the speed of the motor to any desired degree of nicety, but also control the direction of rotation of the motor-armature, it being obvious that the controller may be provided with any desired number of operating-points to correspond with an increased number of resistance-controlling switches without in any way departing from my invention.

I claim as my invention—

1. A system including a motor, means for reversing the same, speed-varying means including a series of independent electromagnetic switches, with a master-controller connected to said apparatus by but two conductors, and including means for governing the operation of said reversing and speed-varying means, substantially as described.

2. A system including a motor, means for controlling the same including speed-varying means and a reversing device, with a master-controller distant from said apparatus but connected thereto by but two conductors, said controller being connected to current-supply mains independently of the remainder of the system and constructed to govern the operation of the reversing and speed-varying means, substantially as described.

3. A system including a motor, a reversing switch or switches therefor, a body of resistance having controlling-switches, actuating means for said switches, with a master-controller having connections for governing the operation of the reversing and the resistance-controlling switches, and being connected to said apparatus by but two conductors, substantially as described.

4. A system including a motor, two pairs of switches connected to serve as a reversing device for said motor, a body of resistance, a series of controlling-switches therefor, a device for operating each of said switches, and a master-controller for governing the actuation of said devices, the elements of said controller, as well as said devices, being interconnected to permit of the use of but two conductors between the controller and the said switches, substantially as described.

5. A motor-controlling system including electromagnetic resistance-controlling switches, auxiliary switches controlled by said main switches and each connected in circuit with the coil of a switch designed to operate after the switch which controls it, current-supply mains adjacent to the switches, a master-controller relatively distant from the switches, independent connections from the master-controller to current-supply mains, and connections between the master-controller and the coils of the resistance-controlling switches, one end of each of the coils of successive switches being alternately connected through the auxiliary switches to different supply-mains adjacent to the switches and the other end of each of said coils being alternately connected through the master-controller to the mains at said controller, substantially as described.

6. A motor-controlling system including electromagnetic switches, auxiliary switches controlled thereby and each connected in circuit with the coil of a switch designed to operate after the switch which controls it, current-supply mains adjacent to the switches, successive switch-actuating coils being alternately connected to supply-mains of different polarity through said auxiliary switches, a master-controller, current-supply mains connected to said controller, and two conductors connecting said controller and the coils of the resistance-controlling switches, said master-controller including means whereby said two conductors are alternately connected to supply to a switch coil or coils a current of sufficient magnitude to actuate the switch thereof, substantially as described.

7. A motor-controlling system including a body of resistance, a series of electromagnetic controlling-switches therefor, a master-controller, and conductors connecting the controller and the coils of said switches, with connections between the said coils and other connections to the controller whereby the operation of said controller causes said conductors to carry to a switch coil or coils a current of a magnitude sufficient to operate the switch or switches thereof, substantially as described.

8. A motor-controlling system including a body of resistance, a series of electromagnetic controlling-switches therefor, a master-controller, two conductors connecting said controller and the coils of said switches, other conductors between the said coils, whereby the operation of the controller causes said two conductors to be supplied with a current of a magnitude sufficient to operate the switches, and means for causing said coils to be successively actuated, substantially as described.

9. A motor-controlling system including a body of resistance, a series of electromagnetic resistance-controlling switches, a master-controller, conductors connected between the controller and the coils of the switches, and connections whereby the operation of said controller causes said conductors to alternately be supplied with a current of sufficient magnitude to operate the switch or switches therefor, with means for cutting down the current flowing through the conductor not so supplied to an extent sufficient to maintain closed the switches already closed but insufficient to close an open switch, substantially as described.

10. A motor-controlling system including a body of resistance, a series of electromagnetic resistance-controlling switches, a master-controller, conductors connected between the controller and the coils of the switches, and connections whereby the operation of said controller causes said conductors to alternately be supplied with a current of sufficient magnitude to operate the switch or switches therefor, with two bodies of resistance for cutting down the current flowing through the conductor not so supplied to an extent sufficient to maintain closed the switches already closed but insufficient to close an open switch, substantially as described.

11. A motor-controlling system including a series of resistance-controlling electromagnetic switches, of which certain have auxiliary switches each in circuit with the coil of a switch designed to operate after it, one end of alternate coils being connected to one supply-main, and one end of the remaining coils being connected to a second supply-main, two conductors respectively connected to the second ends of said two sets of coils, with a master-controller connected to supply-mains and to said conductors having means whereby said conductors may at will be connected to the supply-mains in said controller to actuate said coils, substantially as described.

12. A system including a motor, a reversing switch or switches therefor, a body of resistance having controlling-switches, actuating means for said switches, with a master-controller having connections for governing the operation of the reversing and the resistance-controlling switches, there being direct connections from the current-supply mains to said controller and other independent connections from said mains to the switch-actuating means, substantially as described.

In testimony whereof I have signed my name to this specification in the presence of two subscribing witnesses.

CHAS. D. GILPIN.

Witnesses:
C. W. COMSTOCK,
HOWARD C. TOBEY.